US012596646B2

(12) United States Patent
Muchherla et al.

(10) Patent No.: US 12,596,646 B2
(45) Date of Patent: Apr. 7, 2026

(54) MEMORY MANAGEMENT AMONG MULTIPLE ERASE BLOCKS COUPLED TO A SAME STRING

(71) Applicant: Micron Technology, Inc., Boise, ID (US)

(72) Inventors: Kishore K. Muchherla, San Jose, CA (US); Hong Lu, San Jose, CA (US); Mark Ish, Manassas, VA (US); Akira Goda, Setagaya (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/771,972

(22) Filed: Jul. 12, 2024

(65) Prior Publication Data

US 2025/0077415 A1      Mar. 6, 2025

Related U.S. Application Data

(60) Provisional application No. 63/534,902, filed on Aug. 28, 2023.

(51) Int. Cl.
G06F 12/02 (2006.01)

(52) U.S. Cl.
CPC .. G06F 12/0246 (2013.01); G06F 2212/7202 (2013.01)

(58) Field of Classification Search
CPC ......... G06F 12/0246; G06F 2212/7202; G06F 2212/7205
See application file for complete search history.

(56) References Cited

U.S. PATENT DOCUMENTS

| | | | |
|---|---|---|---|
| 2015/0067232 A1* | 3/2015 | Fontana | G06F 12/0253 |
| | | | 711/103 |
| 2015/0186270 A1* | 7/2015 | Peng | G11C 16/16 |
| | | | 711/3 |
| 2017/0075614 A1* | 3/2017 | Kanno | G06F 3/0679 |
| 2020/0034299 A1* | 1/2020 | Lee | G06F 12/0862 |
| 2021/0019255 A1* | 1/2021 | Akin | G06F 12/0246 |
| 2021/0109856 A1* | 4/2021 | Lee | G06F 11/3037 |
| 2021/0173785 A1* | 6/2021 | Jin | G06F 12/0246 |
| 2021/0303185 A1* | 9/2021 | Mishra | G06F 3/0659 |
| 2022/0147248 A1* | 5/2022 | Dong | G06F 3/0659 |
| 2022/0405000 A1* | 12/2022 | Hong | G06F 3/0652 |

(Continued)

*Primary Examiner* — Nanci N Wong
(74) *Attorney, Agent, or Firm* — Brooks, Cameron & Huebsch, PLLC

(57) ABSTRACT

An apparatus can comprise a memory array comprising a plurality of erase blocks and a plurality of strings of memory cells. Each string of the plurality of strings can comprise: a first group of memory cells coupled to a first group of access lines and corresponding to a first erase block; and a second group of memory cells coupled to a second group of access lines and corresponding to a second erase block. A controller coupled to the memory array can be configured to: receive a write command corresponding to data to be written to the memory array; determine a temperature classification for the data to which the write command corresponds; and, based on the determined temperature classification for the data, route the data to a first write cursor or to one of a number of different write cursors.

15 Claims, 8 Drawing Sheets

(56) References Cited

U.S. PATENT DOCUMENTS

| | | | |
|---|---|---|---|
| 2023/0138471 A1* | 5/2023 | Ngo | G11C 16/10 |
| | | | 365/185.17 |
| 2023/0289078 A1* | 9/2023 | Wells | G06F 3/0604 |
| 2024/0264932 A1* | 8/2024 | Yoo | G11C 16/16 |
| 2024/0419334 A1* | 12/2024 | Radhakrishnan | G06F 3/0647 |

* cited by examiner

|  | PROGRAM TOP DECK | READ/PROGRAM VERIFY TOP DECK |
|---|---|---|
| 320 BL | 0V | 0.5V |
| 326 SGD | 3V | 5V |
| UNSELECTED WL (TOP) | Vpass (10V) | Vpassr (8V) |
| . . . | . . . | . . . |
| UNSELECTED WLn-1 (TOP) | Vpass (10V) | Vpassr1 (8.5V) |
| SELECTED WLn (TOP) | Vpgm (20V) | Vread (0V-7V) |
| UNSELECTED WLn+1 (TOP) | Vpass (10V) | Vpassr1 (8.5V) |
| . . . | . . . | . . . |
| UNSELECTED WL (TOP) | Vpass (10V) | Vpassr (8V) |
| DUMMY WL(s) | Vpass (10V) | Vpassr(8V) |
| UNSELECTED WL (BOTTOM) | Vpass (10V) | Vpassr(8V) |
| . . . | . . . | . . . |
| UNSELECTED WL (BOTTOM) | Vpass (10V) | Vpassr(8V) |
| 327 SGS | 0V | 5V |
| 329 SL | 2V | 0V |

MEMORY MANAGEMENT AMONG MULTIPLE ERASE BLOCKS COUPLED TO A SAME STRING

PRIORITY INFORMATION

This application claims the benefits of U.S. Provisional Application No. 63/534,902, filed on Aug. 28, 2023, the contents of which are incorporated herein by reference.

TECHNICAL FIELD

Embodiments of the disclosure relate generally to memory systems, and more specifically, relate to apparatuses and methods for memory management among multiple erase blocks coupled to a same string.

BACKGROUND

A memory system can include a memory sub-system, which can be a storage device, a memory module, or a hybrid of a storage device and a memory module. Examples of a storage device include a solid-state drive (SSD), a Universal Flash Storage (UFS) drive, a secure digital (SD) card, an embedded Multiple Media Card (eMMC), and a hard disk drive (HDD). Examples of memory modules include a dual in-line memory module (DIMM) and various types of non-volatile dual in-line memory modules (NVDIMMs). Memory systems include one or more memory components (e.g., memory devices) that store data. The memory components can be, for example, non-volatile memory components (e.g., NAND flash memory devices) and volatile memory components (e.g., DRAM devices). In general, a host system can utilize a memory system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3B is a table illustrating bias voltages associated with performing operations on a memory array having multiple erase blocks per string in accordance with various embodiments of the present disclosure.

DETAILED DESCRIPTION

Figure 1:
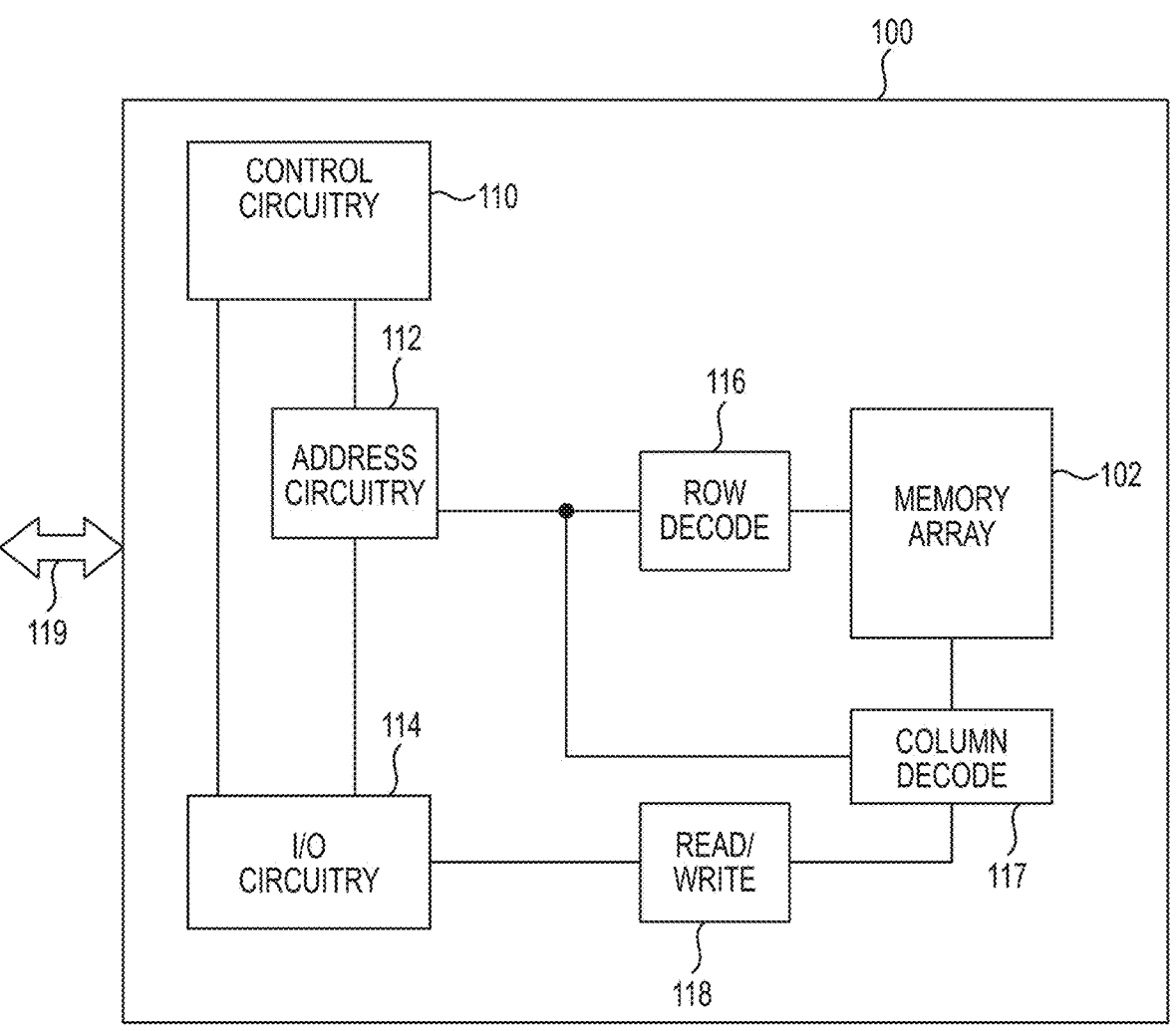
FIG. 1 illustrates an example portion of a memory system including a memory device having an array in accordance with various embodiments of the present disclosure.

Aspects of the present disclosure are directed to apparatuses and methods for memory management among multiple erase blocks coupled to a same string. Various types of memory, such as NAND flash memory, include a memory array of many memory cells that can be arranged in row and column fashion and grouped in physical blocks. The cells can include a charge storage node such as a floating gate or charge-trap layer which allows the cells to be programmed to store one more bits by adjusting the charge stored on the storage node. Generally, an erase operation (e.g., a "block erase") is performed to erase all of the cells of a physical block together as a group.

Three-dimensional (3D) flash memory (e.g., a 3D NAND memory array) can include multiple strings of memory cells with each string comprising multiple series-coupled (e.g., source to drain) memory cells in a vertical direction, with the memory cells of a string sharing a common channel region. Each memory cell of a string can correspond to a different tier of the memory array, with a group of strings sharing multiple access lines, which may be referred to as word lines (WLs). Each access line can be coupled to respective memory cells of each string in the group of strings (e.g., the memory cells of a particular tier of the memory array). Groups of strings are coupled to respective sense lines, which may be referred to as data lines or bit lines (BLs), of a group of sense lines. The cells of the strings can be positioned between a drain-side select gate (referred to as a select gate drain (SGD)) and a source-side select gate (referred to as select gate source (SGS)) used to control access to the strings. A 3D NAND array can be a replacement gate (RG) NAND array or a floating gate NAND array, for example.

A 3D memory array can comprise multiple physical blocks each comprising a plurality of memory pages (e.g., physical pages of cells than can store one or more logical pages of data). In various previous approaches, a block of memory cells corresponds to a smallest group of memory cells that can be erased. For example, in prior approaches it is not possible to erase some of the memory cells of a block while maintaining data in other memory cells of the block.

Some prior approaches that may provide an ability to erase some memory cells of a block while maintaining data in other memory cells of the block can suffer various drawbacks. For example, independently operating groups of cells within a physical block can result in various disturb (e.g., program disturb, read disturb, program verify disturb, erase disturb, etc.) to the other groups of cells within the physical block. Such disturb can result in threshold voltage (Vt) shifts of the victim cells, which can lead to increased bit error rates (BERs) and/or data loss, for example. Various disturb effects can be increased in situations in which one group of cells within a physical block stores data that is frequently overwritten (e.g., "hot" data) while another group of cells sharing a string with the first group of cells stores data that that is not frequently overwritten (e.g., "cold" data that is stored for longer terms and/or infrequently updated such as operating system files or large media files). Disturb effects can be reduced, for example, by refreshing the victim groups. However, such refreshes have drawbacks such as reduced system performance and/or increased write amplification effects, which can reduce the useful life of the system.

Various embodiments of the present disclosure address the above and other deficiencies by providing apparatuses and methods for memory management that can avoid negative effects associated with writing data to memory arrays having multiple erase blocks coupled to a same string. Various embodiments can include determining a temperature classification for data to be written to the array in association with a host write operation and/or a garbage collection (GC) operation and, based on the determined temperature classification for the data, routing the data to a first write cursor (e.g., a host write cursor) or to one of a number of different write cursors (e.g., one or more garbage collection write cursors or one or more additional host write cursors). Additionally, embodiments can include tracking a temperature classification for previously written erase blocks and allocating/assigning free erase blocks to the various write cursors based on the temperature classification of the previously written erase blocks (e.g., the erase blocks storing user data and which share same physical blocks with the free erase blocks). In this manner, embodiments of the present invention can reduce disturb effects by storing data having similar "temperatures" within same physical blocks. As used herein, erase blocks within a same physical block (e.g., erase blocks sharing common strings) can be referred to as "sibling" erase blocks.

As used herein, an "erase block" refers to a group of cells that are configured to be erased together as a group and that share a same string as one or more additional groups of cells (e.g., one or more additional erase blocks). An erase block may also be referred to as a "deck." As such, a physical block of cells can include multiple decks each capable of undergoing program/erase (P/E) cycling irrespective of the other decks. Decks experiencing disturb due to operations (e.g., read operations, program verify operations) performed on one or more other decks sharing a string are referred to as "victim" decks, with the one or more other decks being referred to as "aggressor" decks.

As used herein, the terms "hot" and "cold" with respect to data and/or erase blocks refers to a relative "temperature" of data and/or of an erase block. In general, hot data can refer to data that is more frequently invalidated and/or overwritten (as compared to cold data) in association with host write operations and/or garbage collection operations. As described further herein, temperature classification of data can be based on transfer size and/or on quantities of sequential addresses (e.g., logical blocks addresses (LBAs)) corresponding to the data, with larger transfer sizes and more/longer sequential LBA chains generally being classified as colder than smaller transfer sizes and fewer/shorter sequential LBA chains.

Garbage collection can involve moving valid data (e.g., pages) of an erase block (e.g., source block) to a different erase block (e.g., destination block) in order to erase the source block and add it to a pool of available free erase blocks. Garbage collection is often performed as a background operation (e.g., by a system controller) such that it is transparent to the host. As described further herein, one or more write cursors separate from a host write cursor can be used for garbage collection. A "write cursor" refers to a pointer to a location (e.g., erase block) to be next written and can be maintained, for example, by a flash translation layer (FTL) of a system controller. Multiple write cursors allows the FTL to organize the data. For example, incoming host data can be written to a host write cursor, and garbage collection, which triggers internal data moves (e.g., from one erase block to another), can be accomplished through a dedicated GC cursor. Additional (e.g., separate) write cursors can be allocated for storing firmware tables, applications, etc. Since the host data written to the host cursor can have different "temperatures" and different invalidation characteristics, multiple host cursors can be allocated. Similarly, multiple GC cursors can be allocated for GC data that can have different temperatures and invalidation characteristics. As an example, in various instances, data having the same or similar temperature characteristics can have different invalidation characteristics. For instance two very large files may have a same temperature but be invalidated at different times. In such instances, it can be beneficial for the data to have a corresponding stream identifier (ID), which can be allocated by the host and tracked by the system. In this manner, stream IDs can also be used to, for example, as a criterion for allocating sibling erase blocks to a particular write cursor.

As described further herein, various embodiments can include an apparatus comprising a memory array comprising a plurality of erase blocks and a plurality of strings of memory cells. Each string of the plurality of strings can comprise: a first group of memory cells coupled to a first group of access lines and corresponding to a first erase block; and a second group of memory cells coupled to a second group of access lines and corresponding to a second erase block. A controller coupled to the memory array can be configured to: receive a write command corresponding to data to be written to the memory array; determine a temperature classification for the data to which the write command corresponds; and, based on the determined temperature classification for the data, route the data to a first write cursor or to one of a number of different write cursors.

Various embodiments can include routing data to one of multiple host write cursors and/or to one of multiple garbage collection write cursors based on a temperature classification of the data. As an example, the temperature classification can be based on temperature information provided (e.g., to a system controller) from a host along with, or as part of, write commands. Such temperature information can indicate whether the data corresponding to a write command should be classified as hot or cold data. In some embodiments, the system controller can classify incoming write commands (e.g., as hot or cold) based on the LBA sequentiality corresponding to the write commands. For instance, a relatively long series of sequential LBAs can generally be considered to correspond to relatively cold data as compared to non-sequential LBAs received from a host. In various instances, the system controller can classify erase block temperature by performing a scan of the data stored in the erase block. For example, temperature information such as a sequentiality index can be determined based on LBA information corresponding to the erase blocks. The sequentiality index can be maintained for erase blocks to which data has been previously written and can then be used to classify data to be written to the array and/or to determine to which write cursor free erase blocks are to be allocated. The temperature classification and data routing employed by various embodiments of the present invention can provide various benefits such as reducing disturb effects and/or write amplification by programming erase blocks sharing a common string with data having a similar/same temperature classification.

FIG. 1 illustrates an example portion of a memory system including a memory device 100 having and array 102 in accordance with various embodiments of the present disclosure. The memory array 102 can be a 3D NAND array such as described further in association with FIG. 2, for example. The array can comprise single level cells (SLCs) storing 1 bit per cell, multilevel cells (MLCs) storing 2 bits per cell, triple level cells (TLCs) storing three bits per cell, or quad level cells (QLCs) storing 4 bits per cell, for example. Embodiments are not limited to a particular type of memory cell. The memory device 100 can be part of a memory system such as memory system 790 described in FIG. 7.

The memory device 100 includes control circuitry 110, address circuitry 112, and input/output (I/O) circuitry 114 used to communicate with an external device via an interface 119. The interface 119 can include, for example, a bus used to transmit data, address, and control signals, among other signals between the memory device 100 and an external host device, which can include a controller (e.g., system controller such as controller 791 shown in FIG. 7), host processor (e.g., host 892 shown in in FIG. 7), etc., that is capable of accessing the memory array 102. As an example, the memory device 100 can be within a system such as an SSD with the interface 119 coupling the memory device 100 to a system controller. The interface 119 can include a combined address, control, and data bus or separate busses depending on the particular physical interface and corresponding protocol. The interface 119 can be an Open NAND Flash Interface (ONFI) interface or a Non-Volatile Memory Express (NVMe) interface, a serial attached SCSI (SAS), a serial AT attachment (SATA) interface, a peripheral component interconnect express (PCIe) interface, a universal flash storage (UFS) interface, an 12C/13C interface, and/or other suitable interface (e.g., a parallel interface); however, embodiments are not limited to a particular type of interface or protocol.

The control circuitry 110 can decode signals (e.g., commands) received via interface 119 and executed to control operations performed on the memory array 102. The operations can include data programming operations, which may be referred to as write operations, data read operations, which may be referred to as sensing operations (and can include program verify operations), data erase operations, etc. The control circuitry 110 can cause various groups of memory cells (e.g., pages, blocks, erase blocks, etc.) to be selected or deselected in association with performing memory operations on the array 102. The control circuitry 110 can comprise a state machine, a sequencer, and/or some other type of control circuitry, which may be implemented in the form of hardware, firmware, or software, or any combination thereof.

The I/O circuitry 114 is used for bi-directional communication of data between the memory array 102 and the external device via interface 119. The address circuitry 112, which can include a register, can latch address signals received thereto, and the address signals can be decoded by a row decoder 116 and a column decoder 117 to access the memory array 102. The memory device 100 includes read/write circuitry 118 used to read data from and write data to the memory array 102. As an example, the read/write circuitry can include various latch circuitry, drivers, sense amplifiers, buffers, etc. Data can be read from the memory array 102 by sensing voltage and/or current changes on bit lines of the memory array 102.

Figure 2:
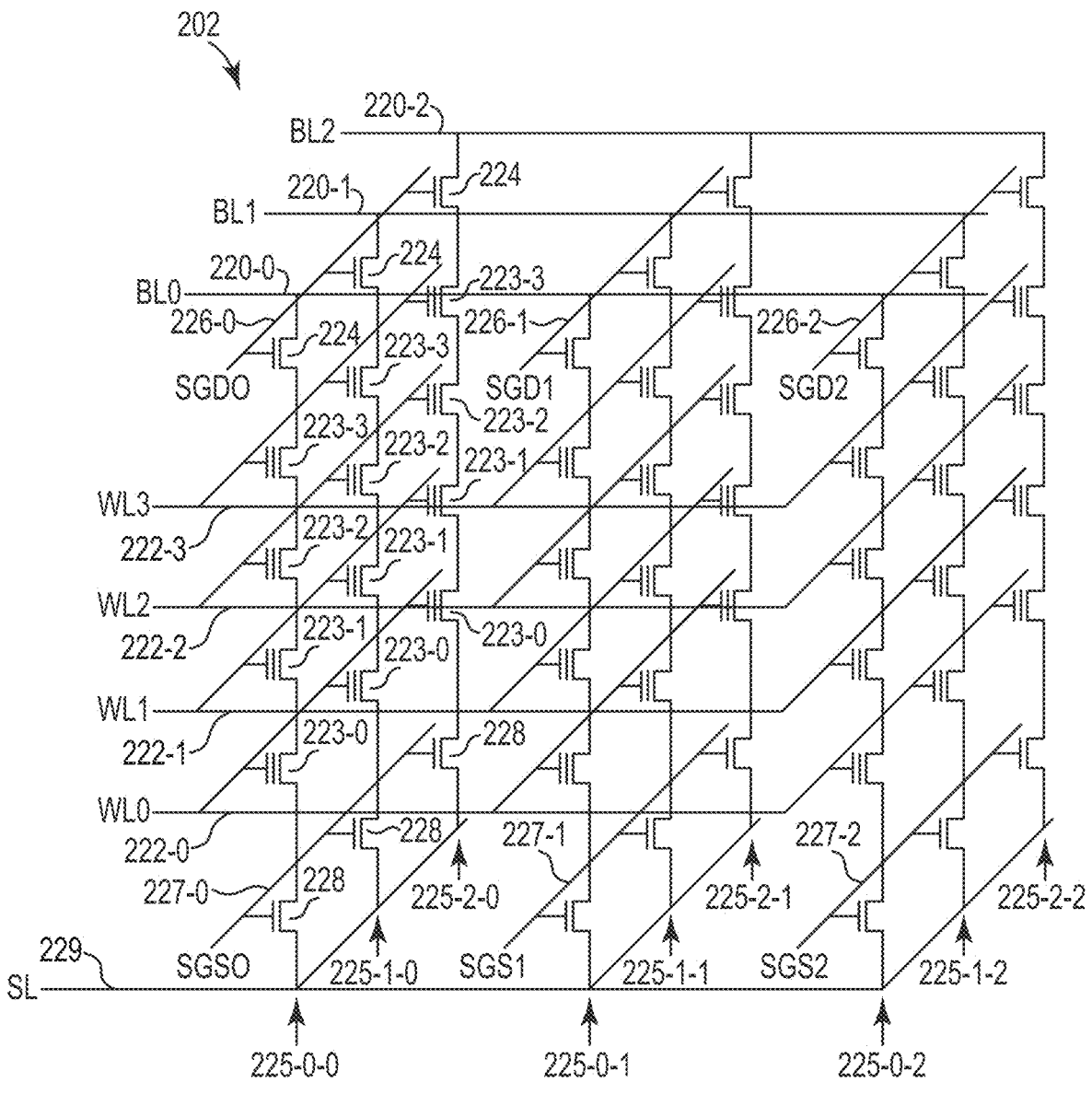
FIG. 2 is a schematic diagram illustrating an example memory array that can be operated in accordance with various embodiments of the present disclosure.

FIG. 2 is a schematic diagram illustrating an example memory array 202 in accordance with various embodiments of the present disclosure. The memory array 202 can be located in a memory device such as memory device 100 described in FIG. 1, for example. The memory array 202 is a 3D NAND array (e.g., RG NAND array or a floating gate NAND array).

The memory array 202 comprises a number of access lines (word lines) 222-0 (WL0), 222-1 (WL1), 222-2 (WL2), and 222-3 (WL3) and a number of sense lines (bit lines) 220-0 (BL0), 220-1 (BL1), and 220-2 (BL2) coupled to multiple strings 225-0-0, 225-0-1, 225-0-2, 225-1-0, 225-1-1, 225-1-2, 225-2-0, 225-2-1, and 225-2-2. The word lines, bit lines, and strings are collectively referred to as word lines 222, bit lines 220, and strings 225, respectively. Although four word lines 222, three bit lines 220, and nine strings 225 are shown, embodiments are not so limited.

Each of the strings 225 comprises a number of memory cells (referred to collectively as memory cells 223) located between a select transistor 224 and a select transistor 228. For example, as shown in FIG. 2, strings 225-0-0, 225-1-0, and 225-1-2 each respectively comprise memory cells 223-0, 223-2, 223-2, and 223-3 located between select transistors 224 and 228 (e.g., respective drain-side select gate (SGD) 224 and source-side select gate (SGS) 228). The memory cells 223 can be floating gate transistors or charge trap cells with the cells 223 of a given string 225 sharing a common channel region (e.g., pillar). As shown, the memory cells 223 of a given string are series-coupled source to drain between the SGD transistor 224 and the SGS.

The memory cells 223 of the strings 225 are stacked vertically such that they are located on distinct tiers/levels of the memory array 202. Each word line 222 can be commonly coupled to all the memory cells at a particular tier/level. For example, word line 222-0 can be coupled to (e.g., as the control gate) the nine memory cells 223-0 corresponding to the nine respective strings 225.

The select gate transistors 224 and 228 can be controlled (e.g., turned on/off) via the corresponding select gate signals SGD0, SGD1, SGD2, SGS0, SGS1, and SGS2 in order to couple the strings 225 to their respective bit lines 220 and a common source line (SL) 229 during memory operations (e.g., reads, writes, erases). As shown in FIG. 2, the select gate signals SGD0, SGD1, and SGD2 are provided (e.g., to the gates of transistors 224) via respective conductive lines 226-0, 226-1, and 226-2, and the select gate signals SGS0, SGS1, and SGS2 are provided (e.g., to the gates of transistors 228) via respective conductive lines 227-0, 227-1, and 227-2. Although the signals SGS0, SGS1, and SGS2 are shown on separate conductive lines 227, in some embodiments the conductive lines 227-0, 227-1, and 227-2 may be coupled via a common SGS line.

To perform memory operations on the array 202, particular voltages (e.g., bias voltages) can be applied to the word lines 222, bit lines 220, and source line 229. The particular voltages applied depends on the memory operation being performed, and different voltages may be applied to the word lines 222 during a particular memory operation in order to store data in a cell (or page of cells) or read data from a cell. For example, an erase operation to remove data from a selected group of memory cells (e.g., a selected erase block) can include applying a relatively high voltage (e.g., 20V) to the source line 229, the relatively high voltage (e.g., 20V) to unselected word lines (e.g., word lines coupled to cells of an erase block not being erased), and a relatively low voltage (e.g., 0V) to the selected word lines (e.g., the word lines coupled to the erase block being erased), which results in erasing of the cells of the selected erase block by removing charge from their charge storage nodes (e.g., charge-trap layers or floating gates) and thereby reducing their Vt levels to near 0V, for example. Additional example biasing schemes are described in more detail in association with FIGS. 3A and 3B.

Figure 3A:
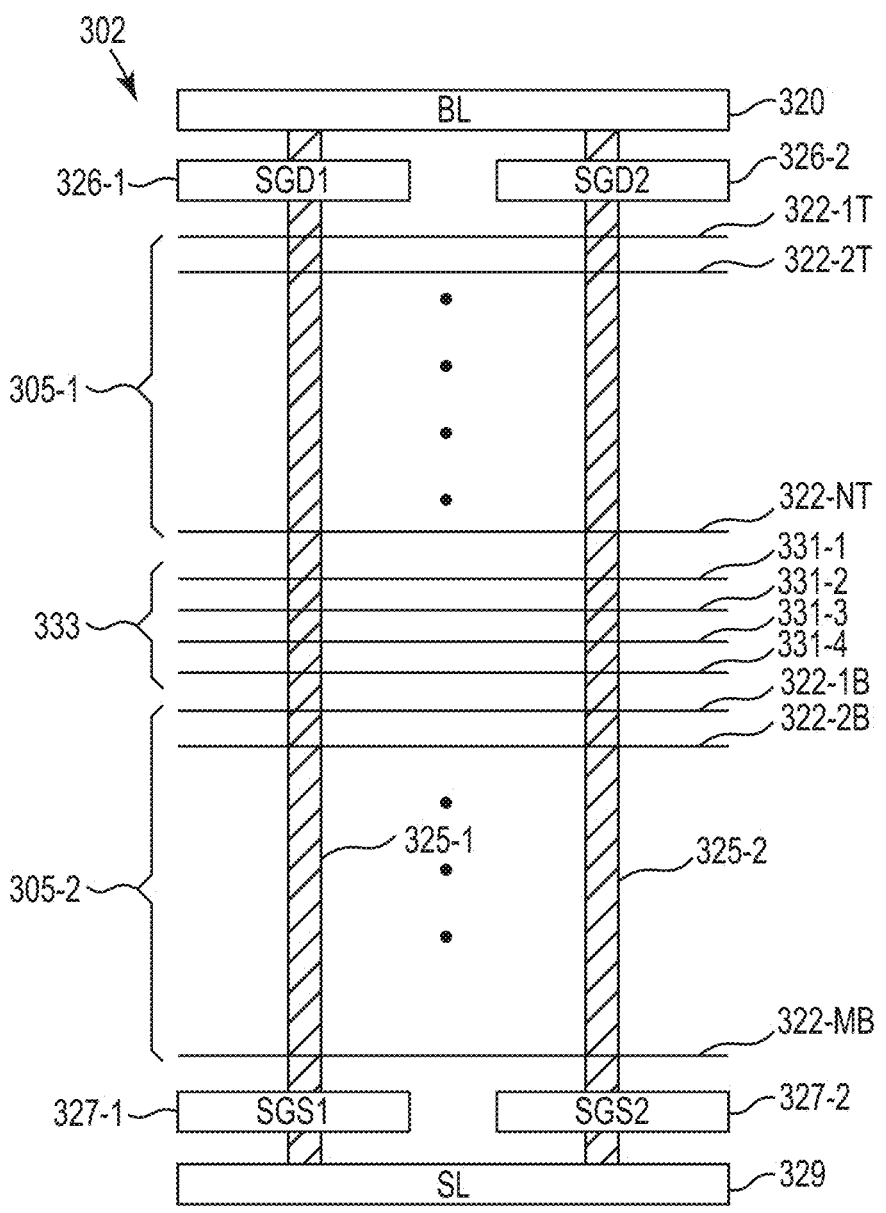
FIG. 3A schematically illustrates a portion of a memory array having multiple erase blocks per string and that can be operated in accordance with various embodiments of the present disclosure.

As described further in FIGS. 3A and 3B, the memory cells 223 of the array 202 can represent a physical block of memory cells that can comprise multiple (e.g., two or more) physical erase blocks. As an example, the word lines 222-0 and 222-1 can be coupled to cells of a first erase block, and the word lines 222-2 and 222-3 can be coupled to cells of a second/different erase block. Therefore, the cells 223-0 and 223-1 of the nine respective strings 225 (e.g., the cells of the first erase block) share respective common strings (e.g., common channel) with the cells 223-2 and 223-3 (e.g., the cells of the second erase block).

As further described herein, an array (e.g., 202) can comprise a number of word lines physically between (e.g., separating) the word lines (e.g., 222) corresponding to different erase blocks. The word lines separating word lines corresponding to different erase blocks can be referred to as "dummy" word lines and can be coupled to dummy memory cells (e.g., within the strings 225) that are not used to store data. The dummy word lines and/or dummy cells can facilitate the ability to perform erase operations separately on erase blocks that share a common string or strings. For example, one erase block within a physical block can be erased without erasing one or more other erase blocks within the physical block. The quantity of dummy word lines between erase blocks can vary, and various bias voltages can be applied to the dummy word lines during the various memory operations performed on the erase blocks.

In operation, erase blocks can be separately (e.g., individually) selected or deselected. For example, an erase operation can be performed on a selected first erase block corresponding to a group of strings while another erase block(s) corresponding to the same group of strings is deselected for the erase operation (e.g., such that is not erased). As described further herein, the ability to independently operate (e.g., write, read, erase) erase blocks within a physical block can result in disturb effects (e.g., Vt shifts) among erase blocks, and such disturb effects can be exacerbated in instances in which particular erase blocks experience P/E cycling at a faster rate than other erase blocks within a physical block. Disturb effects can be mitigated, for example, by refreshing (e.g., rewriting) victim erase blocks. However, increased refreshes result in increased write amplification as the valid data in the victim erase block is moved to a free erase block, and the victim erase block is erased (e.g., as part of a garbage collection process).

Various embodiments of the present disclosure can reduce the amount of erase block refreshing that occurs to mitigate disturb effects by writing data in a manner that erase blocks within a particular physical block have similar temperature characteristics. For example, consider a physical block comprising two erase blocks with one free erase block and one erase block storing relatively cold data (e.g., data that is overwritten or rewritten relatively infrequently). If relatively hot data (e.g., data that is likely to be overwritten or more frequently invalidated and rewritten) is written to the free erase block, then the P/E cycling of the hot erase block will disturb the cold erase block, which will require increased refreshing of the cold erase block as compared to if cold data were to be written to the free erase block.

Figure 7:
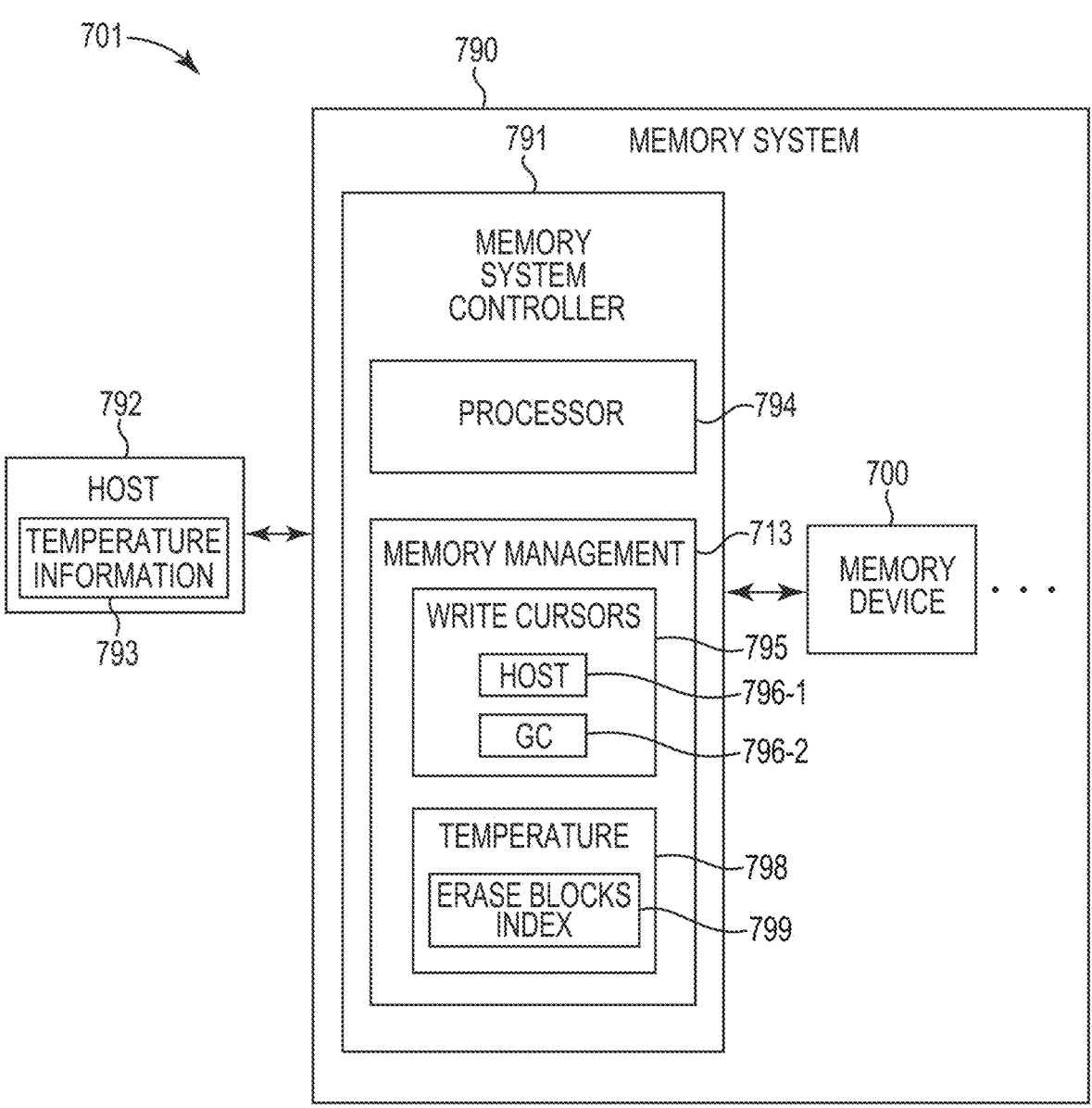
FIG. 7 illustrates an example computing system having a memory system for performing memory management among multiple erase blocks in accordance with various embodiments of the present disclosure.

As described further herein, a memory management component such as memory management component 713 shown in FIG. 7 can maintain respective temperature classifications for the erase blocks of the array (e.g., for the previously written erase blocks). The temperature classifications for the erase blocks can be determined, for example, based on respective sequentiality indexes corresponding to the erase blocks. As used herein, a sequentiality index refers to a measure of an amount of sequentially written data within an erase block. For example, an erase block primarily storing relatively large media files likely includes more sequentially written LBAs as compared to an erase block primarily storing smaller chunks of data (e.g., meta data files) with random LBAs. Accordingly, a larger sequentiality index can correspond to a "cold" data classification for an erase block, and a smaller sequentiality index can correspond to a "hot" data classification for the erase block. The sequentiality indexes corresponding to the erase blocks can be tracked by a system controller, and can be determined, for example, by performing a scan operation (e.g., periodically) that involves traversing a page order in which data was written to an erase block and determining the corresponding amount of LBA sequentiality corresponding to the written pages. A table of sequentiality indexes for the erase blocks can be maintained (e.g., stored) by the controller. Based on the designations of previously written erase blocks (e.g., as hot or cold), free erase blocks sharing strings with the previously written erase blocks can be allocated for use by an appropriate write cursor. For instance, a free erase block coupled to a same string as a "hot" erase block (e.g., an erase block with a high/large sequentiality index) can be allocated to a write cursor designated for writing relatively hot data (e.g., a host write cursor), and a free erase block coupled to same string as a "cold" erase block (e.g., an erase block with a low/small sequentiality index) can be allocated to a write cursor designated for writing relatively cold data (e.g., a garbage collection cursor) such that data written to free erase blocks has a similar temperature classification as data stored in the previously written erase block. As described further in FIG. 4, for example, various embodiments can include maintaining multiple host write cursors and/or multiple GC write cursors and routing received host data and GC data among the write cursors based on the determined temperature classification of the data in order to achieve efficiencies associated with embodiments of the present invention.

FIG. 3A schematically illustrates a portion of a memory array 302 having multiple erase blocks per string that can be operated in accordance with various embodiments of the present disclosure. FIG. 3B is a table illustrating bias voltages associated with performing operations on a memory array having multiple erase blocks per string in accordance with various embodiments of the present disclosure, such as the array 302 shown in FIG. 3A. The example shown can be a portion of the array 202 described in FIG. 2. The array portion 302 can be a portion of a physical block of memory cells that includes multiple erase blocks (e.g., decks); although, embodiments of the present disclosure are not limited to arrays comprising multiple erase blocks per physical block.

In this example, the array 302 includes a plurality/group of word lines 322-1T, 322-2T, . . . , 322-NT corresponding to a first erase block 305-1 (e.g., a top deck) and a plurality/group of word lines 322-1B, 322-2B, . . . , 322-MB corresponding to a second erase block 305-2 (e.g., bottom deck). The designators "N" and "M" can represent various numbers (e.g., 3 or more) and "N" and "M" can be the same number. Accordingly, embodiments are not limited to a particular quantity of word lines 322 for the top deck 305-1 or bottom deck 305-2 (the designator "T" corresponding to "top" and the designator "B" corresponding to "bottom"). The array 302 also includes a number of dummy word lines 331-1, 331-2, 331-3, and 331-4, which can be collectively referred to as word lines 331. The dummy word lines 331 correspond to a separation region 333 between the top deck 305-1 and bottom deck 305-2. Although four word lines 331 are illustrated, embodiments can include more or fewer than four dummy word lines 331 separating erase blocks corresponding to same strings.

The array portion 302 illustrates two strings 325-1 and 325-2 for ease of illustration; however, embodiments can include many more strings 325. Memory cells are located at the intersections of the word lines 322/331 and strings 325, with the memory cells of a particular string 325 sharing a common channel region (e.g., pillar) as described in FIG. 2. The dummy word lines 331 can be coupled to dummy memory cells (e.g., cells that are not addressable to store user data).

As illustrated in FIG. 3A, a first end of the strings 325-1 and 325-2 can be coupled to a common source line 329 via respective select gate source lines 327-1 (SGS1) and 327-2 (SGS2). The second/opposite end of the strings 325-1 and 325-2 can be coupled to a bit line 320 via respective select gate drain lines 326-1 (SGD1) and 326-2 (SGD2). As such, the strings 325 (e.g., the cells thereof) can be individually accessed using the bit line 320 and select gates to which the lines 326-1 and 326-2 are coupled. Although only a single bit line 320 is shown, embodiments can include multiple bit lines such as shown in FIG. 2, for example.

As noted herein, in various embodiments, the top deck 305-1 and the bottom deck 305-2 can be read, programmed, and/or erased via separate operations even though the cells of the decks 305-1/305-2 share the same strings 325-1/325-2. For example, each one of the decks 305-1 and 305-2 can be individually programmed and/or erased without programming or erasing the other of the decks 305-1 and 305-2.

Column 371 of the table shown in FIG. 3B represents example biasing voltages applied to an array (e.g., 302) in association with performing a programming operation on a selected deck (e.g., top deck 305-1). Column 373 represents example biasing voltages applied to the array in association with performing a read operation or a program verify operation on a selected deck (e.g., 305-1).

The example programming operation shown in column 371 of FIG. 3B involves applying a programming voltage (Vpgm) to a selected word line (e.g., SELECTED WLn) within the selected deck (e.g., the top deck 305-1). The programming voltage can be applied to the selected word line as a plurality of pulses, for example, and is intended to increase the Vt of a selected cell by adding charge to its storage node (e.g., charge-trap layer or floating gate). As illustrated, the unselected word lines of the string (e.g., the remaining word lines of the top deck 305-1, the dummy word lines, and the word lines of the bottom deck 305-2) are biased with a program pass voltage (Vpass). The bit line 320 corresponding to the selected string is biased at 0V, the drain select gate 326 is biased at 3V, the source select gate 327 is biased at 0V, and the source line 329 is biased at 2V during the programming operation.

A programming operation involves performing program verify operations to determine when the Vt of the cells being programmed have reached a desired level. As such, a program verify operation essentially involves performing a read operation on the selected cells (e.g., the cells coupled to the selected word line). As shown in column 373 of FIG. 3B, a read operation and/or a program verify operation can involve applying a read voltage (Vread) to the selected word line (SELECTED WLn), while applying a read pass voltage (Vpassr or Vpassr1) to the unselected word lines of the string (e.g., the remaining word lines of the top deck 305-1, the dummy word lines, and the word lines of the bottom deck 305-2). The read pass voltage is designed to place the unselected cells of a string in a conductive state in order to allow current to flow through the string depending on the applied read voltage (Vread) and Vt of the selected cell. In this manner, the read or program verify operation can be used to determine if the Vt of the selected cell is above or below a particular level (e.g., above or below Vread).

In this example, the bit line 320 corresponding to the selected string is biased at 0.5V, the drain select gate 326 is biased at 5V, the source select gate 327 is biased at 5V, and the source line 329 is biased at 0V during the read or program verify operation. As shown in FIG. 3B, the unselected word lines (e.g., WLn+1 and WLn−1) adjacent to the selected word line (e.g., WLn) can be biased at a higher read pass voltage (e.g., Vpassr1) as compared to the other unselected word lines, which are biased at Vpassr. As an example, Vpassr1 can be 8.5V-9.5V and Vpassr can be 8V. The increased Vpassr1 voltage can counteract a "pull down" voltage on WLn+1 and WLn−1 that results from coupling between WLn+1/WLn−1 and WLn, depending on the bias (Vread) on WLn. Such pull down can result in cells coupled to WLn+1/WLn−1 not being fully conductive (e.g., turned on) during the read, which can result in read errors. However, the increased Vpassr1 (as compared to Vpassr) can result in increased read disturb stress on the cells coupled to WLn+1 and WLn−1 (e.g., for cells coupled to WLn+1/WLn−1 and that have relatively low Vts).

Figure 4:
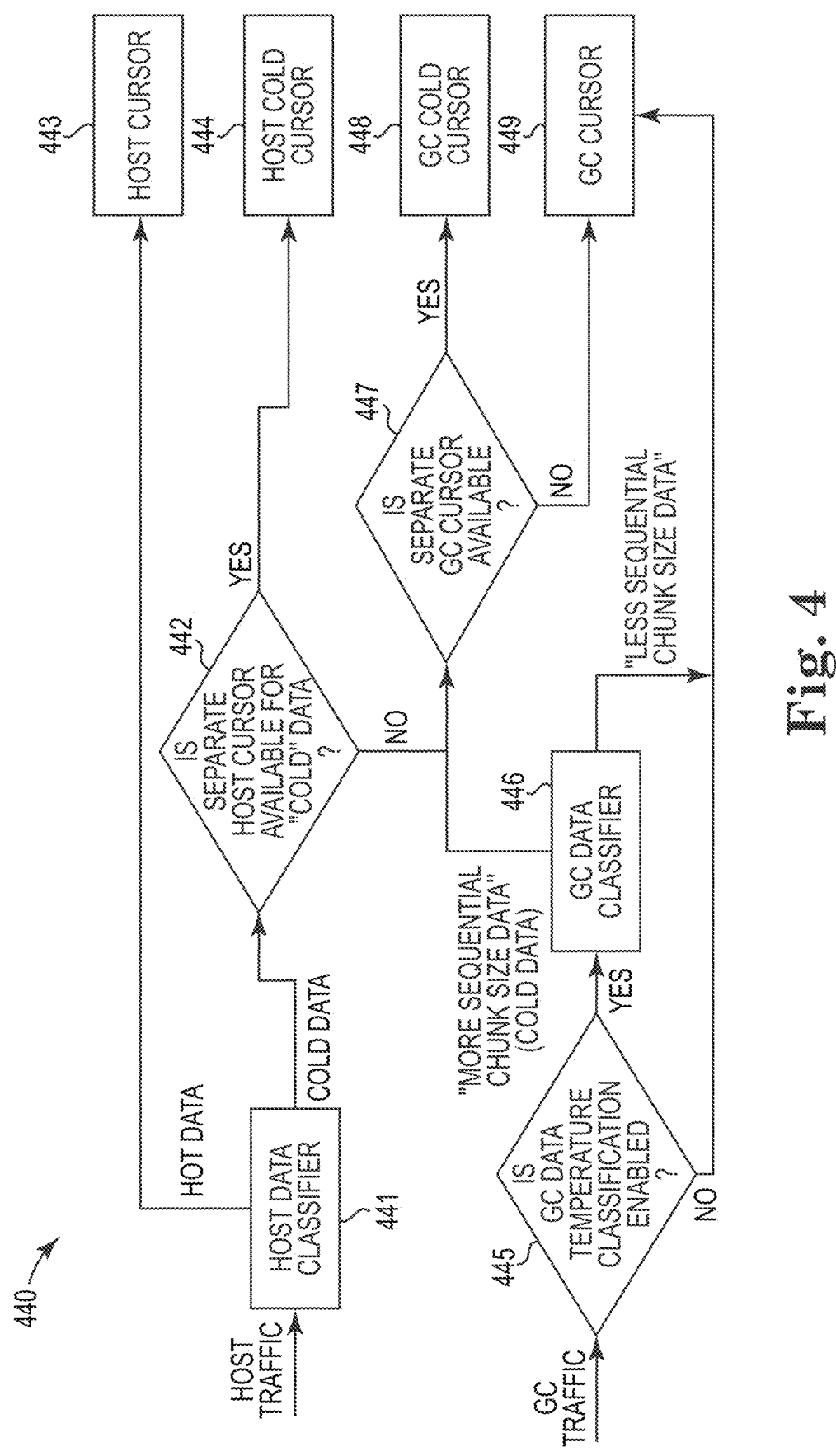
FIG. 4 is a flow diagram illustrating memory management among multiple erase blocks coupled to a same string in accordance with various embodiments of the present disclosure.

FIG. 4 is a flow diagram illustrating memory management among multiple erase blocks coupled to a same string in accordance with various embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the control circuitry 110 of FIG. 1 and/or the controller 791 of FIG. 7. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Various embodiments of the present disclosure involve receiving a write command corresponding to data to be written to a memory array. The write commands can be associated with host traffic (e.g., write commands from a host) and garbage collection (GC) traffic (e.g., write commands associated with performing garbage collection). The host traffic can be received by a controller of a memory system (e.g., system controller 791 of system 790 shown in FIG. 7), and the GC traffic can be received and/or generated by the system controller. The host traffic can be provided/generated by a host such as host 792 shown in FIG. 7.

As shown in FIG. 4, host traffic can be received by a host data classifier 441. The host data classifier 441 can be a component of a controller (e.g., controller 792) and can be implemented in software, firmware, or hardware, or combinations thereof. In operation, the host data classifier 441 can determine a temperature classification for the host data to be written to a memory array (e.g., array 102, 202, 302, 502, 602). The host data can be routed to one of a number of write cursors based on the determined temperature classification for the data. This example includes four different write cursors 443 (HOST CURSOR), 444 (HOST COLD CURSOR), 448 (GC COLD CURSOR), and 449 (GC CURSOR);

however, embodiments are not limited to this example. For instance, some embodiments may include only one host cursor (e.g., 443) and one GC cursor (e.g., 449), or one or more of the additional cursors (e.g., 444 and 448) may exist but be disabled or unavailable. In general, host write cursor 443 can be associated with writing data classified as hot data and GC cursor 449 can be associated with writing data classified as cold data since GC traffic generally is cooler than host traffic. In this example, host write cursor 443 corresponds to a relatively hot destination (e.g., erase block) to be written as compared to the host cold write cursor 444. Similarly, GC cold write cursor 448 corresponds to a relatively colder destination to be written as compared to GC cursor 449.

The host data classifier 441 can classify data corresponding to the host traffic in a number of manners. For instance, in some embodiments, the host (e.g., host 792) can provide temperature information (e.g., 793) along with, or as part of, write commands that can indicate a temperature classification for the corresponding data to be written to the array. As an example, the temperature information can be one or more bits designating a temperature classification for the corresponding data. In embodiments in which the host does not provide temperature information (e.g., "hints") to the host data classifier 441, the host data classifier 441 can determine a temperature classification for the data based on, for example, a transfer size corresponding to the data and/or LBA characteristics corresponding to the data. As an example, received data corresponding to a chain of multiple sequential LBAs and/or corresponding to a large transfer size can be classified as relatively cold as compared to shorter transfer sizes or non-sequential LBAs. In various embodiments, the host can also provide a stream ID along with, or as part of, the write commands, and the stream IDs can be used to allocate erase blocks to write cursors.

Responsive to the temperature classification of the host data, the method 440 includes routing the data to either host write cursor 443 or to one of the additional write cursors 444, 448, and 449. In this example, the host traffic is classified as either hot or cold; however, embodiments are not so limited. For example, other/additional temperature classifications are possible (e.g., warm). Host traffic classified as hot data is routed to host write cursor 443. As shown at 442, host traffic classified as cold data is routed to host cold cursor 444 if a separate host cold write cursor is available. If a separate host cold write cursor does not exist, then the cold host traffic is routed to one of the GC write cursors 448 or 449. As shown at 447, if a separate GC write cursor (e.g., 448) is available, then the cold host traffic is routed to the GC cold write cursor 449. If the separate GC write cursor 448 is unavailable, then the cold host traffic is routed to the GC write cursor 449. However, embodiments are not so limited. For example, in instances in which host cold cursor 444 and GC cold cursor 448 do not exist or are unavailable, host traffic identified as cold data can be routed either to host cursor 443 or GC cursor 449.

Various embodiments can include a GC data classifier 446 that can be used to classify received GC traffic in instances in which multiple GC write cursors are available and in which GC temperature classification is enabled. The GC data classifier 446 can be a component of a controller (e.g., controller 792) and can be implemented in software, firmware, or hardware, or combinations thereof. In operation, the GC data classifier 446 can determine a temperature classification for the GC data to be written to a memory array (e.g., array 102, 202, 302, 502, 602). In embodiments in which GC data temperature classification is enabled, the GC data can be routed to one of a number of write cursors based on the determined temperature classification for the data. This example includes two different GC write cursors 448 (GC COLD CURSOR) and 449 (GC CURSOR); however, embodiments are not limited to this example.

The GC data classifier 446 can classify data corresponding to the GC traffic in a number of manners. For instance, in various embodiments, a component of the controller (e.g., temperature component 798) can classify the GC traffic based on a determined sequentiality index corresponding to the data. For instance, the temperature component can perform a scan of erase blocks to determine whether the data corresponds to relatively long sequential LBA chains (e.g., longer files corresponding to relatively colder GC data) or relatively short LBA chains (e.g., shorter files corresponding to relatively warmer GC data).

As shown at 445 of method 440, responsive to GC data temperature classification not being enabled, the GC traffic is routed to GC cursor 449. As shown at 447, when GC data temperature classification is enabled and GC traffic is classified as cold data by GC data classifier 446, the GC data is routed to GC cold write cursor 448 (if available) and to GC write cursor 449 if GC cold write cursor is unavailable (or does not exist). When GC data temperature classification is enabled and GC traffic is classified is not classified as cold data by GC data classifier 446, the GC data is routed to GC write cursor 449, which generally serves as a less cold write destination as compared to GC cold write cursor 448.

The method 440 can be executed in association with performing memory management among multiple erase blocks coupled to a same string. Determining temperature classifications for host and/or GC traffic, and routing the write traffic to particular write cursors based on the determined temperature classification can facilitate storing data having similar temperature characteristics in sibling erase blocks, which can provide benefits such as reduced write amplification, among other benefits. In various embodiments, the write cursors can also be associated with respective stream IDs such that erase blocks allocated with user data will have a corresponding stream ID. Accordingly, when the FTL is allocating erase blocks (e.g., free erase blocks) to the write cursors, the stream IDs can be used as a selection criterion (e.g., in order to reduce the mixing of erase blocks having different stream IDs in a particular physical block). For example, the FTL can preferably select an erase block whose sibling erase block(s) with valid user data has the same stream ID.

Figure 5:
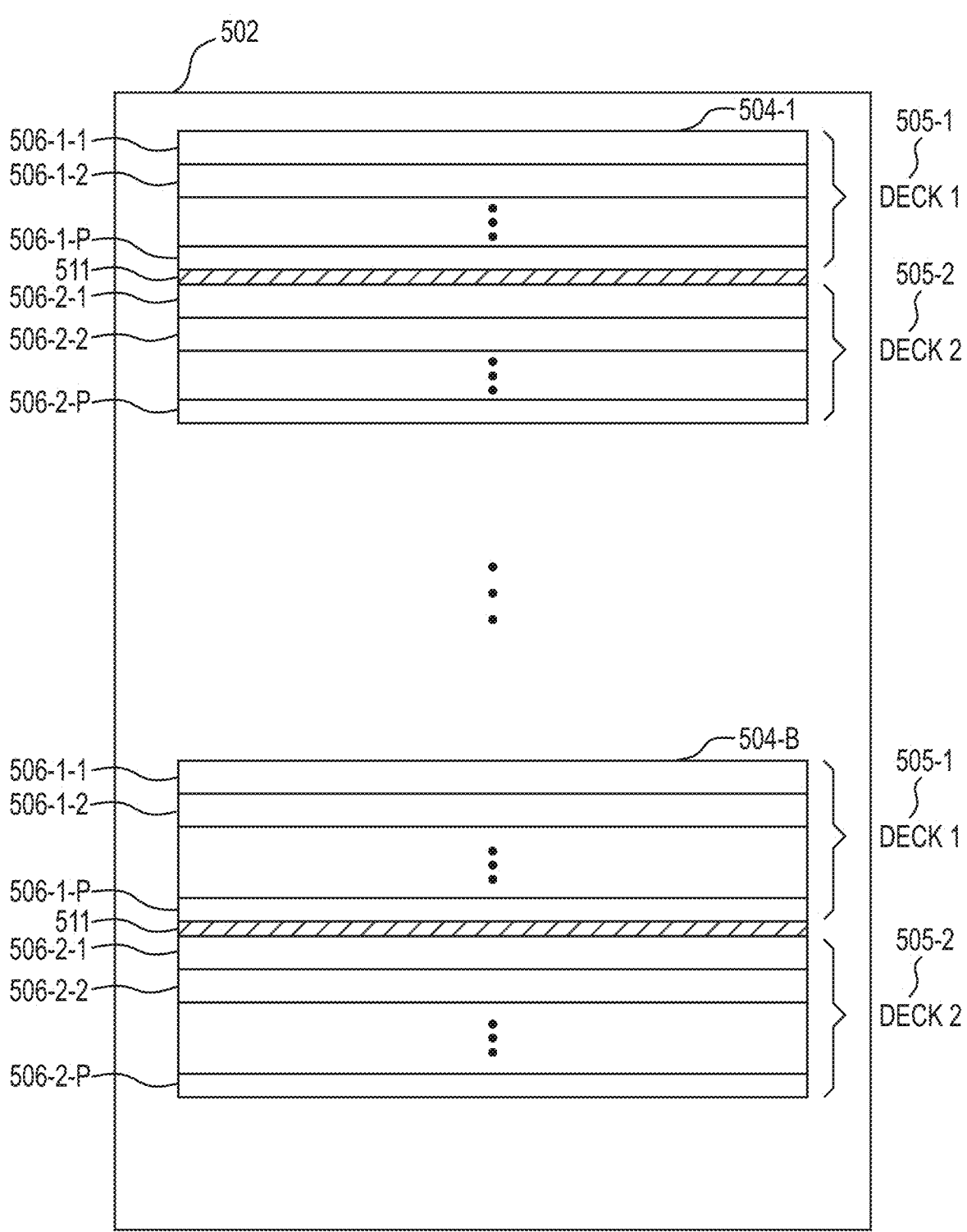
FIG. 5 illustrates a portion of a memory array having multiple erase blocks per string and that can be operated in accordance with various embodiments of the present disclosure.

FIG. 5 illustrates a portion of a memory array 502 having multiple erase blocks per string in accordance with various embodiments of the present disclosure. The memory array 502 includes multiple physical blocks 504-1, . . . , 504-B and can be operated in accordance with one or more embodiments of the present disclosure. The indicator "B" is used to indicate that the array 502 can include a number of physical blocks 504. As an example, the number of physical blocks in array 502 can be 128 blocks, 512 blocks, or 1,024 blocks, but embodiments are not limited to a particular multiple of 128 or to any particular number of physical blocks in an array 502. The memory array 502 can be, for example, a NAND flash memory array (e.g., a 3D NAND flash array such as array 102, 202, and/or 302).

Each of the physical blocks 504-1, . . . , 504-B includes a first erase block 505-1 (DECK_1) and a second erase block 505-2 (DECK_2) separated by a region 511, which can correspond to a region of dummy word lines such as word lines 331 shown in FIG. 3A. As described above, the decks 505-1 and 505-2 are commonly coupled to the strings of the blocks 504-1, . . . , 504-B with the decks 505-1 and 505-2 being separately erasable via a block erase operation (e.g., deck 505-1 can be erased without erasing deck 505-2 and vice versa). Although the physical blocks 504 are shown as including two decks, embodiments are not so limited. For example, the physical blocks 504 can include more than two decks and in some embodiments different physical blocks 504 can include different quantities of decks.

Each deck 505-1 and 505-2 can comprise a number of physical pages, which can correspond to a "row" of the array corresponding to a particular word line. As shown, deck 505-1 comprises pages 506-1-1, 506-1-2, . . . , 506-1-P, and deck 505-2 comprises pages 506-2-1, 506-2-2, . . . , 506-2-P. The designator "P" is used to indicate that the decks 505-1 and 505-2 can comprise a plurality of pages/rows. Each physical page (collectively referred to as pages 506) can store multiple logical pages of data. A page can refer to a unit of programming and/or reading (e.g., a group of cells that are programmed and/or read together as a functional group).

As described further herein, temperature classification information can be maintained and/or tracked on a per deck basis. The deck temperature information (e.g., sequentiality index) can be used to allocate free decks to one of a number of write cursors in association with host write operations and/or garbage collection operations.

Figure 6:
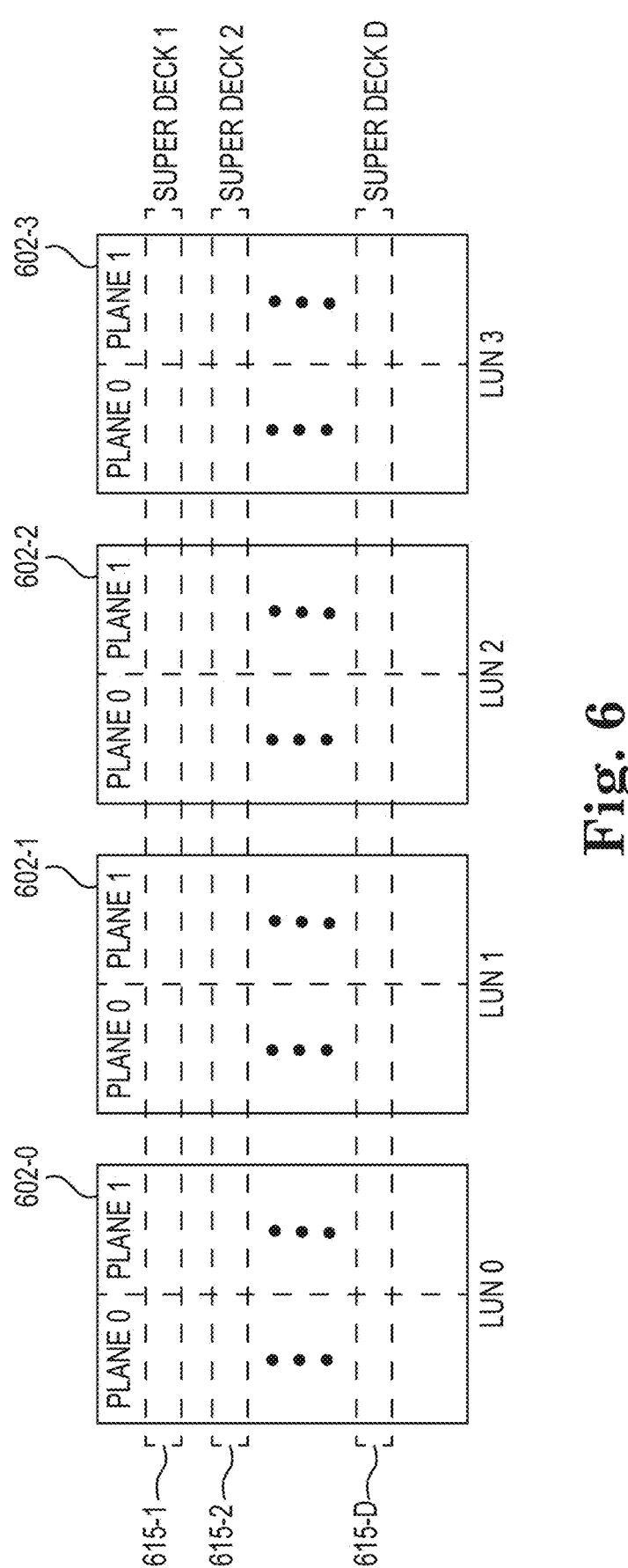
FIG. 6 illustrates a portion of a memory device having multiple erase blocks per string in accordance with various embodiments of the present disclosure.

FIG. 6 illustrates a portion of a memory device having multiple erase blocks in accordance with various embodiments of the present disclosure. In various embodiments, the physical blocks of a memory array can be organized into planes. For example, FIG. 6 illustrates memory arrays 602-0, 602-1, 602-2, and 602-3 each divided into a first plane (PLANE 0) of physical blocks and a second plane (PLANE 1) of physical blocks. Embodiments are not limited to a particular quantity of planes per array. Each array 602-0, 602-1, 602-2, and 602-3 corresponds to a respective logical unit (LUN) LUN0, LUN1, LUN2, and LUN3. Each LUN can correspond to a different memory device (e.g., memory device 100 shown in FIG. 1); however, embodiments are not so limited. For example, a memory device (e.g., die) can include multiple LUNs. A LUN can, for example, correspond to a smallest unit that can independently execute commands and report status.

The physical blocks of the planes can comprise multiple erase blocks sharing common strings as described herein. The physical blocks can be grouped into "super blocks" with each super block comprising a physical block from each plane (e.g., PLANE 0 and PLANE 1) across multiple LUNs (e.g., across multiple arrays 602). Similarly, embodiments of the present disclosure an include a number of super decks 615-1 (SUPER DECK_1), 615-2 (SUPER DECK_2), . . . , 615-D (SUPER DECK_D). Each super deck (or super erase block) 615 can comprise a deck from each plane across multiple LUNs. For example, a first super deck 615-1 (SUPER DECK_1) can comprise a deck from plane 0 of LUNG, a deck from plane 1 of LUN1, a deck from plane 0 of LUN1, a deck from plane 1 of LUN1, a deck from plane 0 of LUN2, a deck from plane 1 of LUN2, a deck from plane 0 of LUN3, and a deck from plane 1 of LUN3.

Embodiments of the present disclosure can monitor temperature classification information on a super deck level as well as, or instead of, on a deck level. For instance, consider an example in which the constituent decks of a super deck 615-1 share common strings with the respective constituent decks of a super deck 615-2 (e.g., super decks 615-1 and 615-2 are located in a same physical super block). The decks of super deck 615-1 can be erased together as a group.

FIG. 7 illustrates an example computing system 701 having a memory system for memory management among multiple erase blocks coupled to a same string in accordance with various embodiments of the present disclosure. As shown in FIG. 7, the memory system 790 includes a system controller 791 and a number of memory devices 700, which can be memory devices such as device 100 described in FIG. 1 (e.g., memory devices comprising memory arrays having multiple erase blocks coupled to common strings).

In some embodiments, the memory system 790 is a storage system. An example of a storage system is a solid-state drive (SSD). In some embodiments, the memory system 790 is a hybrid memory/storage sub-system. In general, the computing environment shown in FIG. 7 can include a host system 792 that uses the memory system 790. For example, the host system 792 can write data to the memory system 790 and read data from the memory system 790.

The memory system controller 791 (hereinafter referred to as "controller") can communicate with the memory devices 700 to perform operations such as reading data, writing data, or erasing data at the memory devices 700 and other such operations. The controller 791 can include hardware such as one or more integrated circuits and/or discrete components, a buffer memory, or a combination thereof. The controller 791 can include a microcontroller, special purpose logic circuitry (e.g., a field programmable gate array (FPGA), an application specific integrated circuit (ASIC), etc.), or other suitable processing circuitry. The controller 791 can include a processing device (e.g., processor 794) configured to execute instructions stored in local memory (not shown).

In this example, the controller 791 includes a memory management component 713. The memory management component 713 can be associated with a flash translation layer (FTL), for example. The component 713 can be responsible for, among other things, tracking temperature information 799 for erase blocks storing data, determining a temperature classification for data to be written to a memory array of device 700, and based on the determined temperature classification for the data to be written to the memory array, route the data to one of the write cursors. The memory management component can also be responsible for allocating free erase blocks for use by the write cursors 795 based on a temperature classification of one or more sibling erase blocks.

In general, the controller 791 can receive commands or operations from the host system 792 and can convert the commands or operations into instructions or appropriate commands to achieve the desired access to the memory devices 700. The controller 791 can be responsible for other operations such as wear leveling operations, garbage collection operations, error detection and error-correcting code (ECC) operations, encryption operations, caching operations, and address translations between a logical block address and a physical block address that are associated with the memory devices 700.

The memory management component 713 can include multiple write cursors 795. In this example, the write cursors 795 include one or more host write cursors 796-1 and one or more garbage collection write cursors 796-2, which can be write cursors such as those described in association with FIG. 4.

The memory management component 713 includes a temperature component 798. The temperature component 798 can determine a temperature classification for the data to which a write command corresponds and, based on the determined temperature classification for the data, route the data to an appropriate one of the write cursors 796-1 or 796-2 to write the data to a selected erase block of the memory device 700. In some embodiments, a host 792 can provide temperature information 793 to the memory system 790 within (or along with) host write commands, and the temperature information can indicate a temperature classification corresponding to the data and/or can be used to determine the temperature classification corresponding to the data. As an example, the temperature information 793 can indicate a quantity of sequential LBAs corresponding to the write command. As previously mentioned, the host 792 can also provide a stream ID along with the write commands such that erase blocks can have an associated stream ID and can be allocated to the write cursors 795 based on the stream ID.

The temperature component 798 can also allocate free erase blocks for use by write cursors 795 based on the temperature classification of one or more sibling erase blocks. For instance, the temperature component 798 can maintain respective temperature classifications for erase blocks of the plurality of erase blocks that are storing previously written data. The temperature classification information can be, for example, sequentiality indices corresponding to the respective erase blocks. The temperature classification information can be tracked on a per erase block basis and can be stored in a data structure 799, which can be a table stored in a relatively small memory (e.g., SRAM, DRAM, etc.). In various examples, free erase blocks are designated to particular write cursors 795 in a manner such that data to be written to the free erase blocks will have a similar (or same) temperature classification as data written to sibling erase blocks of the free erase block. For example, if a free erase block has sibling erase blocks having a "cold" temperature classification (e.g., as indicated by a sequentiality index 799), then the free erase block can be allocated to a selected write cursor 795 having a relatively cold temperature classification (e.g., a GC write cursor 796-2 or a host cold write cursor if one is available).

The memory management component 713 can perform wear leveling on the memory device 700. In association with performing wear leveling, the memory management component 713 can designate, as free physical blocks, those physical blocks having only free erase blocks. In various embodiments, the wear leveling can be performed at the physical block level (as opposed to at the erase block level) when physical blocks include only free erase blocks (e.g., none of the constituent erase blocks of the physical block are in a non-erased state). If no free physical blocks are identified, then the wear leveling can be performed at the erase block level.

In a number of embodiments, the memory device 700 can include a component 795 that can store erase block program state information that can be passed to the controller 791 in the event of a power failure, for example. The component 795 can be a relatively small memory (e.g., DRAM, SRAM, etc.).

The host system 792 can be a computing device such as a desktop computer, laptop computer, network server, mobile device, or other such computing device that includes a memory and a processing device. The host system 792 can include, or be coupled to, the memory system 790 so that the host system 792 can read data from or write data to the memory system 790. The host system 792 can be coupled to the memory system 790 via a physical host interface (not shown in FIG. 7). As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, a universal flash storage (UFS) interface, a universal serial bus (USB) interface, Fibre Channel, Serial Attached SCSI (SAS), etc. The physical host interface can be used to transmit data between the host system 792 and the memory system 790. The host system 792 can further utilize an NVM Express (NVMe) interface to access the memory devices 700 when the memory system 790 is coupled with the host system 792 by the PCIe interface. The physical host interface can provide an interface for passing control, address, data, and other signals between the memory system 790 and the host system 792.

While the example memory system 790 in FIG. 7 has been illustrated as including the controller 791, in another embodiment of the present disclosure, a memory system 790 may not include a controller 791, and can instead rely upon external control (e.g., provided by a processor or controller separate from the memory system 790, such as by host 792 communicating directly with the memory devices 700).

Although the memory system 790 is shown as physically separate from the host 792, in a number of embodiments the memory system 790 can be embedded within the host 792. Alternatively, the memory system 790 can be removable from the host 792.

As used herein, an "apparatus" can refer to various structural components. For example, the computing system 701 shown in FIG. 7 can be considered an apparatus. Alternatively, the host 792, the controller 791, and the memory device 700 might each separately be considered an apparatus.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 502 in FIG. 5. As will be appreciated, elements shown in the various embodiments herein can be added, exchanged, and/or eliminated so as to provide a number of additional embodiments of the present disclosure.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C). Additionally, the phrase "at least one of A and B" means one or more of (A) or one or more of (B), or one or more of (A) and one or more of (B) such that both one or more of (A) and one or more of (B) is not required.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

receiving a write command corresponding to data to be written to a memory array comprising a plurality of physical blocks each comprising multiple independently erasable erase blocks, wherein the multiple erase blocks corresponding to a respective physical block comprise:

a first erase block comprising a first group of memory cells coupled to a first string corresponding to the respective physical block; and a second erase block comprising a second group of memory cells coupled to the first string corresponding to the respective physical block;

determining a temperature classification for the data to which the write command corresponds; and based on the determined temperature classification for the data, routing the data to a first write cursor or to one of a number of different write cursors;

wherein the first write cursor is a host write cursor and the number of different write cursors includes a garbage collection write cursor, and wherein the method includes, responsive to receiving the write command at a controller from a host:

responsive to the determined temperature classification for the data being a first temperature, routing the data to the host write cursor;

responsive to the determined temperature classification for the data being a second temperature, routing the data to one of the garbage collection write cursor or a different host write cursor;

responsive to the number of different write cursors not including an additional host write cursor, routing the data to the garbage collection write cursor; and responsive to the number of different write cursors including an additional host write cursor, routing the data to the additional host write cursor.

2. The method of claim 1, wherein the method further comprises:

tracking, on an erase block basis, a temperature classification for erase blocks storing data;

designating free erase blocks within respective physical blocks for use by either the first write cursor or for use by one of the number of different write cursors based on the temperature classification of the erase blocks storing data.

3. The method of claim 1, wherein the method further comprises:

tracking, on an erase block basis, respective stream identifications (IDs) for erase blocks storing data;

designating free erase blocks within respective physical blocks for use by either the first write cursor or for use by one of the number of different write cursors based on the respective stream IDs of the erase blocks storing data.

4. An apparatus, comprising:

a memory array comprising a plurality of erase blocks and a plurality of strings of memory cells, wherein each string of the plurality of strings comprises:

a first group of memory cells coupled to a first group of access lines and corresponding to a first erase block; and a second group of memory cells coupled to a second group of access lines and corresponding to a second erase block; and a controller coupled to the memory array and configured to:

receive a write command corresponding to data to be written to the memory array;

determine a temperature classification for the data to which the write command corresponds; and based on the determined temperature classification for the data, route the data to a first write cursor or to one of a number of different write cursors;

wherein each string of the plurality of strings corresponds to a respective physical block of a plurality of physical blocks, with each physical block comprising a respective first erase block and respective second erase block, and wherein the controller is configured to, in association with performing wear leveling on the memory array:

designate, as free physical blocks, those physical blocks among the plurality of physical blocks that comprise a free respective first erase block and a free respective second erase block;

responsive to identifying one or more free physical blocks, perform wear leveling at the physical block level; and in the absence of identifying one or more free physical blocks, perform wear leveling at the erase block level.

5. The apparatus of claim 4, wherein the controller is configured to maintain respective temperature classifications for erase blocks of the plurality of erase blocks that are storing previously written data.

6. The apparatus of claim 5, wherein the first erase block is a free erase block, and wherein the controller is configured to designate the free erase block for use by the first write cursor or for use by one of the different number of write cursors based on a temperature classification of the second erase block.

7. The apparatus of claim 4, wherein the write command is received from a host, and wherein the controller is configured to determine the temperature classification based on a temperature indication provided by the host along with the write command.

8. The apparatus of claim 4, wherein the write command is received from a host, and wherein the controller is configured to determine the temperature classification based on a quantity of sequential logical block addresses corresponding to the write command.

9. The apparatus of claim 4, wherein the first write cursor is a host write cursor, and wherein the number of different write cursors includes at least one additional host write cursor and at least one garbage collection write cursor.

10. An apparatus, comprising:

a memory array comprising a plurality of physical blocks of strings of memory cells, wherein each physical block of the plurality of physical blocks comprises multiple erase blocks that are independently erasable, and wherein the multiple erase blocks within a particular physical block comprise memory cells coupled to a same string corresponding to the particular physical block; and a controller coupled to the memory array and configured to:

track temperature information for the erase blocks storing data;

allocate free erase blocks for use by one of a first write cursor or by one of a number of different write cursors based on a temperature classification of one or more erase blocks corresponding to a same physical block as a respective free erase block;

determine a temperature classification for data to be written to the memory array; and based on the determined temperature classification for the data to be written to the memory array, route the data to one of the first write cursor or to one of the number of different write cursors; and wherein the controller is further configured to, in association with performing wear leveling on the memory array:

designate, as free physical blocks, those physical blocks among the plurality of physical blocks that comprise a free respective first erase block and a free respective second erase block;

responsive identifying one or more free physical blocks, perform wear leveling at the physical block level; and in the absence of identifying one or more free physical blocks, perform wear leveling at the erase block level.

11. The apparatus of claim 10, wherein the temperature information for the erase blocks storing data comprises a sequentiality index.

12. The apparatus of claim 11, wherein the controller is configured to determine the sequentiality index by performing a scan operation on the erase blocks.

13. The apparatus of claim 10, wherein the controller comprises:

host data classifier circuitry to determine the temperature classification for data received from a host in association with host write operations; and garbage collection classifier circuitry to determine the temperature classification for data received in association with garbage collection write operations.

14. The apparatus of claim 10, wherein each physical block of the memory array comprises at least three erase blocks.

15. The apparatus of claim 10, wherein the memory array comprises a three-dimensional replacement gate NAND array.

* * * * *